United States Patent
Runau (10) Patent No.: US 10,486,297 B2
(45) Date of Patent: Nov. 26, 2019

(54) PROTECTIVE SHELL OF A TOOL BATTERY

(71) Applicant: Hilti Aktiengesellschaft, Schaan (LI)

(72) Inventor: Benjamin Runau, Karlsruhe (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/568,761

(22) PCT Filed: Apr. 22, 2016

(86) PCT No.: PCT/EP2016/059019
§ 371 (c)(1),
(2) Date: Oct. 23, 2017

(87) PCT Pub. No.: WO2016/170120
PCT Pub. Date: Oct. 27, 2016

(65) Prior Publication Data
US 2018/0193995 A1    Jul. 12, 2018

(30) Foreign Application Priority Data

Apr. 24, 2015 (EP) ..................... 15165019

(51) Int. Cl.
*B25F 5/02* (2006.01)
*H01M 2/10* (2006.01)
*B25F 5/00* (2006.01)

(52) U.S. Cl.
CPC ............... *B25F 5/02* (2013.01); *B25F 5/006* (2013.01); *H01M 2/1022* (2013.01); *H01M 2/1094* (2013.01)

(58) Field of Classification Search
CPC combination set(s) only.
See application file for complete search history.

(56) References Cited

U.S. PATENT DOCUMENTS

| | | | |
|---|---|---|---|
| 5,347,684 A | 9/1994 | Jackson | |
| 5,401,591 A * | 3/1995 | Bishay | ............... G06K 7/10881 |
| | | | 429/123 |
| 6,805,207 B2 * | 10/2004 | Hagan | ..................... B25B 21/00 |
| | | | 173/162.1 |

(Continued)

FOREIGN PATENT DOCUMENTS

| | | |
|---|---|---|
| DE | 201 17 889 U1 | 1/2002 |
| EP | 1 312 448 A1 | 5/2003 |

(Continued)

OTHER PUBLICATIONS

PCT/EP2016/059019, International Search Report dated Aug. 9, 2016 (Three (3) pages).

*Primary Examiner* — Kaity V Chandler
(74) *Attorney, Agent, or Firm* — Crowell & Moring LLP (57) ABSTRACT

A protective shell of a tool battery for a hand-held tool battery having a tool battery housing is disclosed. The protective shell of the tool battery is formed in a sandwich construction with an outer shell and an intermediate layer acting as a damping layer. The intermediate layer is configured softer and/or more elastic than the outer shell. The intermediate layer is disposed on the outer shell in such a way that it is disposed between the outer shell and a surface of the tool battery housing when the protective shell of the tool battery is disposed on the tool battery housing.

15 Claims, 9 Drawing Sheets

(56) References Cited

U.S. PATENT DOCUMENTS

| | | | |
|---|---|---|---|
| 7,101,300 B2* | 9/2006 | Milbourne | B23B 45/008 475/265 |
| 9,356,267 B1* | 5/2016 | To | H01M 2/1094 |
| 9,931,118 B2* | 4/2018 | Shelton, IV | A61B 17/2909 |
| 2003/0094294 A1* | 5/2003 | Fritz | B25F 5/006 173/171 |
| 2005/0058890 A1* | 3/2005 | Brazell | H01M 2/1055 429/99 |
| 2008/0245453 A1* | 10/2008 | Law | A45C 11/38 150/154 |
| 2011/0293979 A1* | 12/2011 | Igarashi | H01M 2/1072 429/99 |
| 2012/0061117 A1 | 3/2012 | Nagasaka | |
| 2014/0161513 A1* | 6/2014 | Chellew | B25F 5/00 403/322.1 |
| 2016/0249908 A1* | 9/2016 | Shelton, IV | A61B 17/068 227/175.1 |
| 2016/0249918 A1* | 9/2016 | Shelton, IV | H02J 7/0013 227/175.1 |

FOREIGN PATENT DOCUMENTS

| | | |
|---|---|---|
| EP | 1 516 702 A2 | 3/2005 |
| GB | 2 432 036 A | 5/2007 |

\* cited by examiner

PROTECTIVE SHELL OF A TOOL BATTERY

This application claims the priority of International Application No. PCT/EP2016/059019, filed Apr. 22, 2016, and European Patent Document No. 15165019.9, filed Apr. 24, 2015, the disclosures of which are expressly incorporated by reference herein.

BACKGROUND AND SUMMARY OF INVENTION

The present invention relates to a protective shell of a tool battery for a hand-held tool battery having a tool battery housing. The present invention also relates to a hand-held tool battery.

Hand-held tool batteries serve to supply a hand-held machine tool, in particular a jackhammer or a combination hammer with an electric supply current. Protective shells of tool batteries, which are essentially known from the prior art, serve to protect hand-held tool batteries from external environmental influences such as for example dust, moisture, and impacts.

The object of the present invention is to indicate a protective shell of a tool battery and a hand-held tool battery, which provide improved protection against influences or are better protected from such.

With regard to the protective shell of a tool battery, the object is achieved by the protective shell of a tool battery being formed in a sandwich construction with an outer shell and an intermediate layer acting as a damping layer, the intermediate layer being configured softer and/or more elastic than the outer shell, and the intermediate layer being arranged on the outer shell in such a way that it is situated between the outer shell and a surface of the tool battery housing when the protective shell of a tool battery is arranged on the tool battery housing.

The invention includes the knowledge that when a hand-held tool battery received in a hand-held machine tool falls on the ground unprotected, it may result in the tool battery housing breaking. This applies all the more so for large and heavy batteries, i.e., in particular for hand-held tool batteries with 22 volts or 36 volts supply voltage. Protective shells of tool batteries of the prior art are typically very bulky and heavy and thus solve the problem of break protection in a very user-unfriendly manner.

Since the protective shell of a tool battery according to the invention is formed in a sandwich construction with an outer shell and an intermediate layer acting as a damping layer, and the intermediate layer is softer and/or more elastic than the outer shell, local tension concentrations or tension peaks, which typically occur when the hand-held tool battery impacts on a hard surface, are distributed over a larger surface and thus the probability of the tool battery housing breaking is minimized. Advantageously, the protective shell of a tool battery according to the invention can be implemented in a comparatively thin and lightweight manner, which is particularly user-friendly. Moreover, it has been recognized that a deformation of the tool battery housing caused by a fall is particularly effectively prevented and thus an input of impact energy into the battery cells, which are accommodated in the tool battery housing, can be reduced. Moreover, the outer shell of the protective shell of a tool battery provides increased wear resistance in comparison to protective shells of tool batteries of the prior art since the outer shell can be designed comparatively rigidly.

In a particularly preferred configuration, the outer shell comprises an outer shell elasticity modulus and the intermediate layer comprises an intermediate layer elasticity modulus, and the outer shell elasticity modulus is larger than the intermediate layer elasticity modulus. The measurement of the elasticity modulus can be determined in compliance with EN ISO 527-1 (European standard for plastic for determining the tensile properties). The outer shell of the protective shell of a tool battery can for example have an elasticity modulus greater than 1500 MPA (mega pascal), preferably greater than 2000 MPA. The outer shell of the protective shell of a tool battery preferably consists of plastic. It can, for example, consist of shock-resistant polystyrene with an elasticity modulus greater than 1500 MPA, preferably greater than 2000 MPA.

The intermediate layer acting as a damping layer preferably consists of plastic. The intermediate layer acting as a damping layer preferably comprises an elasticity modulus of less than 2000 MPA, preferably less than 1500 MPA, further preferably less than 1000 MPA or 500 MPA. It has been found to be advantageous when the intermediate layer consists of an elastomer, in particular a thermoplastic elastomer.

The outer shell and the intermediate layer can consist of the same material and comprise thicknesses that are different to each other. This has the advantage that only one material group has to be provided which favors affordable production of the protective shell of a tool battery. The intermediate layer preferably consists of a foamed plastic. The intermediate layer can consist of a thermoplastic elastomer, which is compact or foamed. The intermediate layer can consist of compact or foamed nitrile rubber or synthetic rubber. It has been found to be advantageous when the intermediate layer consists of polystyrene.

It has also been found to be advantageous when the outer shell has higher shore hardness than the intermediate layer. Shore hardness is determined according to DIN ISO 7619-1. The outer shell can thus, for example, have hardness greater than 80 shore A and the intermediate layer a hardness less than 80 shore A, preferably less than 70 shore A or 60 shore A.

In order to further minimize a reduction of tension peaks caused by impact, the sandwich construction preferably comprises an additional shell and an additional intermediate layer. The additional shell and/or the additional intermediate layer can be arranged in relation to the outer shell in such a way that they are situated between the outer shell and the surface of the tool battery housing. Additional shells and further intermediate layers are preferably alternated with each other. A respective additional intermediate layer particularly preferably has an intermediate layer elasticity modulus and an additional shell has an outer shell elasticity modulus, and the intermediate layer elasticity modulus is less than the outer shell elasticity modulus.

It has been found to be advantageous when the outer shell and the additional shell consist of the same material. It has been found to be advantageous when the intermediate layer and the additional intermediate layer consist of the same material.

The intermediate layer can have a wall thickness of between 0.5 mm and 10 mm, preferably of between 2 mm and 2.5 mm. The outer shell preferably has a wall thickness of between 0.5 mm and 10 mm, preferably of between 2 mm and 2.5 mm. In the context of simple producibility, it has been found to be advantageous when the intermediate layer has a substantially constant wall thickness. Alternatively, the wall thickness of the intermediate layer can vary. It has been found to be advantageous when the wall thickness of the intermediate layers scales with the impact direction relative to the center of gravity position of the tool battery on which the protective shell of a tool battery is to be applied. In other words, the wall thickness of the intermediate layer is designed with a higher wall thickness than in other regions at the point where the tool battery housing typically contacts the ground during a fall.

In a particularly preferred configuration, an overall wall thickness of the protective shell of a tool battery is less than 10 mm, preferably independent of the number of intermediate layers and/or shells encompassed by it. In other words, an outer shell, a first intermediate layer, an intermediate layer, and an additional intermediate layer can, for example, be provided, whose (summary) overall wall thickness is less than 10 mm. An overall wall thickness of the protective shell of a tool battery can preferably be between 4 and 5 mm. It has been found that this constitutes an optimum between material usage and impact resistance in typical construction site situations.

The protective shell of a tool battery can be formed so that it can be fastened by means of an adhesive connection to the tool battery housing. Alternatively or additionally, the protective shell of a tool battery can be fastenable by means of a snap-in connection to the tool battery housing. It has been found to be advantageous when the protective shell of a tool battery can be or is fastened on the tool battery housing by means of a film hinge, which preferably cooperates with the snap-in connection.

The protective shell of a tool battery can particularly favorably be produced when the outer shell and/or the intermediate layer are formed on the tool battery housing by means of an injection molding process, in particular by means of co-injection.

It has been found to be advantageous when the protective shell of a tool battery is formed as a corner protector and/or edge protector for a tool battery. The protective shell of a tool battery is preferably formed to precisely receive a corner and/or an edge of the tool battery housing and to leave a predominate portion of the surface of the tool battery housing uncovered. The protective shell of a tool battery can be formed in such a way that it completely encloses precisely two corners and the edge delimited by these two corners.

With regard to the hand-held tool battery, the object is achieved by a hand-held tool battery with a previously-described protective shell of a tool battery, which is configured to be fastenable or is fastened to the tool battery housing.

Additional advantages emerge from the following description of the figures. Different exemplary embodiments of the present invention are represented in the figures. The figures, the description, and the claims include numerous features in combination. The person skilled in the art will expediently also consider the features individually and combine them to form reasonable additional combinations.

Identical and similar components are labelled with the same reference numerals in the figures.

DETAILED DESCRIPTION OF THE DRAWINGS

Figure 1:
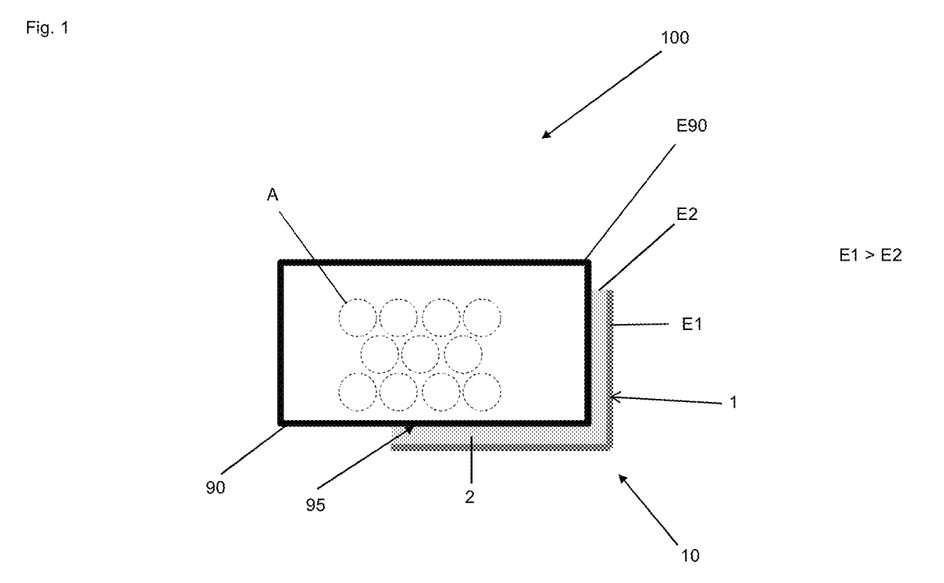
FIG. 1 is a schematic representation of a first exemplary embodiment of a protective shell of a tool battery according to the invention.

A protective shell of a tool battery 10 is represented in FIG. 1. It comprises an outer shell 1 and an intermediate layer 2, which are provided in a sandwich construction. Outer shell 1 and intermediate layer 2 can be substantially congruent to each other in all exemplary embodiments. As can be discerned from FIG. 1, the intermediate layer 3 is arranged on the outer shell 1 in such a way that it is situated between the outer shell 1 and a surface 95 of the tool battery housing 90 when, as shown, the protective shell of a tool battery 10 is arranged on the tool battery housing 90. The tool battery housing 90 is part of a hand-held tool battery 100, which is designed to supply a hand-held machine tool (not shown) with battery cells A.

In the present exemplary embodiment, the outer shell 1 has an outer shell elasticity modulus E1 of 2500 MPA. The outer shell 1 consists of a shock-resistant polystyrene. In the present exemplary embodiment, the tool battery housing 90 also consists of a shock-resistant polystyrene. The elasticity modulus E90 of the tool battery housing 90 is also 2500 MPA. The intermediate layer 2 situated between the surface 95 of the tool battery housing 90 and the outer shell 1, which acts as a damping layer, is in the present case a foamed, thermoplastic elastomer with an intermediate layer elasticity modulus E2 of 500 MPA. The outer shell elasticity modulus E1 is therefore greater than the intermediate layer elasticity modulus E2.

When the hand-held tool battery 100 falls on the ground, the impact energy is initially input into the outer shell 1 of the protective shell of a tool battery 10 and distributed inside the outer shell 1, and further distributed to the intermediate layer 2 acting as a damping layer. Tension peaks are thus held off by the actual surface 95 of the tool battery housing 90 whereby absorption of impact energy by the battery cells A is reduced or largely prevented.

Figure 2:
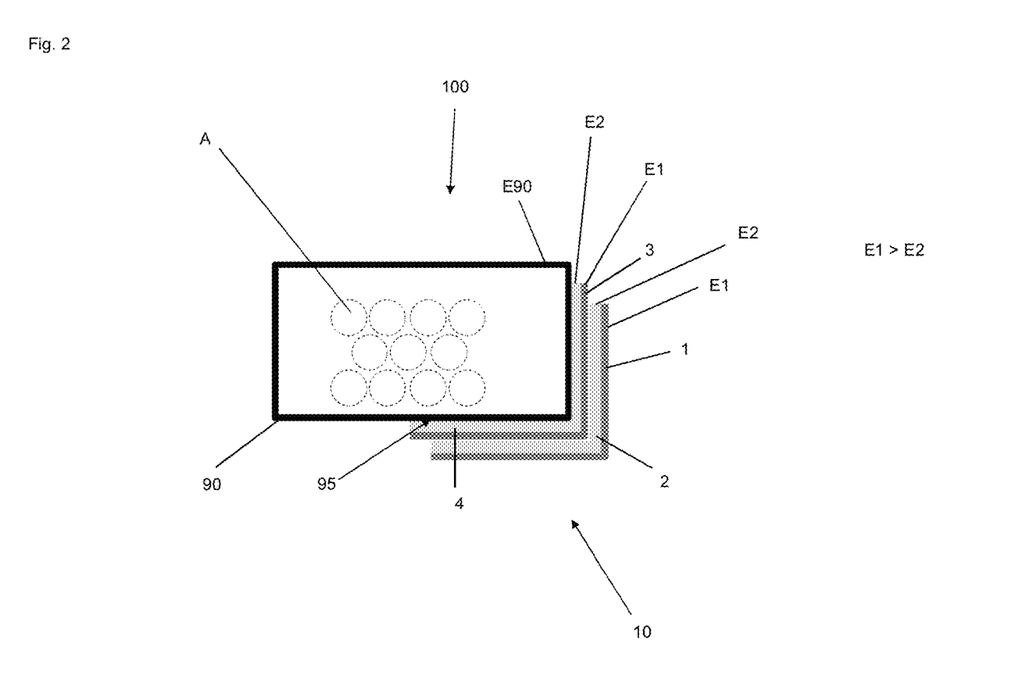
FIG. 2 is a schematic representation of a second exemplary embodiment of a protective shell of a tool battery according to the invention.

A protective shell of a tool battery 10 in FIG. 2 comprises an outer shell 1 and an intermediate layer 2 acting as a damping layer in a sandwich construction. Moreover, the protective shell of a tool battery 10 comprises an additional shell 3, adjacent to the intermediate layer 2 and an additional intermediate layer 4, adjacent to the additional shell 3. The intermediate layers 2, 4 are arranged in relation to the outer shell 1 in such a way that they are situated between the outer shell 1 and the surface 95 of the tool battery housing 90 when, as shown, the protective shell of a tool battery 10 is arranged on the tool battery housing 90. Likewise, the additional shell 3, which is arranged between the two intermediate layers 2, 4, is situated between the outer shell 1 and the surface 95 of the tool battery housing 90.

In the represented exemplary embodiment, the outer shell 1 and the additional shell 3 have the same outer shell elasticity modulus E1. The two intermediate layers 2, 4 respectively comprise an intermediate layer elasticity modulus E2, which is less than the outer shell elasticity modulus E1. The tension distribution inside the protective shell of a tool battery 10 is further improved by the sandwich construction shown in FIG. 2 with alternating shells 1, 3 and intermediate layers 2, 4. In this case, it can be discerned that the intermediate layers 2, 4 and the outer shell 1 and the additional shell 3 have a substantially constant wall thickness.

Figures 3A, 3B, 3C, 3D:
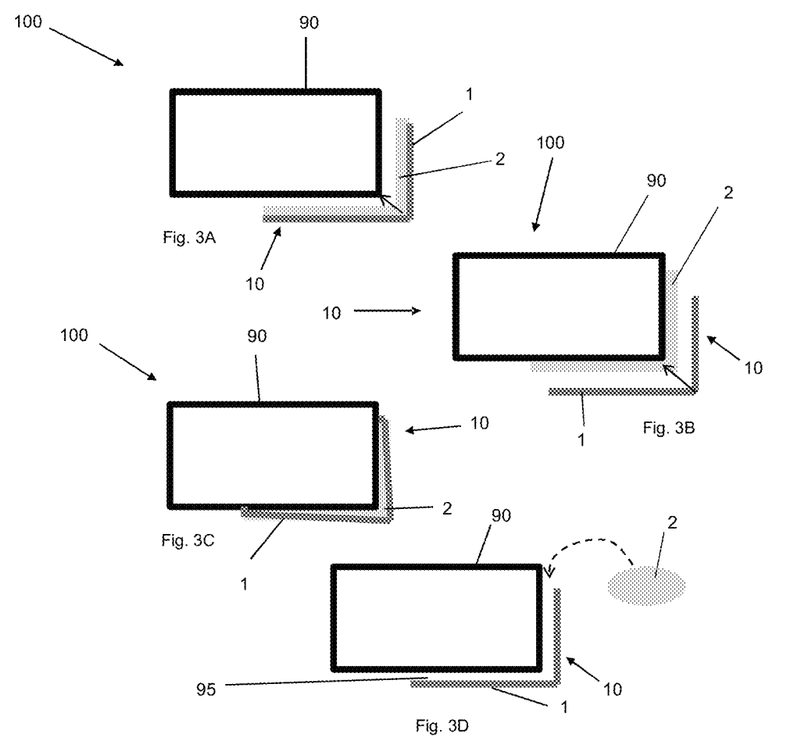
FIGS. 3A to 3D are schematic representations of protective shells of tool batteries manufactured differently.

FIGS. 3A to 3D show hand-held tool batteries 100 that are provided differently. In FIG. 3A, the protective shell of a tool battery 10 is formed as a separate component that can be fastened on the hand-held tool battery 100. For fastening, the intermediate layer 2 acting as a damping layer comprises an adhesive surface by means of which the protective shell of a tool battery 10 can be fastened completely to the tool battery housing 90 of the hand-held tool battery 100. Alternatively or in addition to the described adhesive layer, the protective shell of a tool battery 10 can also be fastened to the hand-held tool battery 100 by means of a snap-in or latch connection as is explained with reference to the figures below. In FIG. 3A, the protective shell of a tool battery 10 is, therefore, fastened to the tool battery housing 90 as a two-component sandwich construction.

It can be discerned from FIG. 3B that the intermediate layer 2 acting as a damping layer is already arranged on the tool battery housing 90 and the outer shell 1, indicated by the arrow direction, is fastened to the intermediate layer 2. Fastening can for example take plate by means of an adhesive connection and/or latch connection. FIG. 3B, therefore, shows the arrangement of the outer shell 1 on a tool battery housing 90 provided with an intermediate layer 2 whereby the sandwich construction of the protective shell of a tool battery 10 results in the assembled state.

In FIG. 3C, the protective shell of a tool battery 10 is provided by a co-injection process as the sandwich component. In this case, the outer shell 1 and the intermediate layer 2 are generated simultaneously in an injection molding process. It is also ideal if the outer shell 1 and the intermediate layer 2 consist of the same material, but have different thicknesses to each other. This can for example be achieved by different degrees of foaming of a plastic, which is used to produce the outer shell 1 and the intermediate layer 2, being implemented during the co-injection.

FIG. 3D lastly shows an additional variant of the provision of a protective shell of a tool battery 10 on a hand-held tool battery 100. In this case, the outer shell 1 is initially arranged at a defined distance, for example 10 mm from the surface 95 of the tool battery housing 90 and the intermediate layer 2 is injected as an injection-molded mass into the intermediate space. In this way, a sandwich construction with an outer shell 1 and an intermediate layer 2 acting as the damping layer is achieved as a result, and the intermediate layer 2 is arranged on the outer shell 1 in such a way that the intermediate layer is situated between the outer shell 1 and the surface 95 of the tool battery housing 90 when the protective shell of a tool battery 10 is arranged on the tool battery housing 90.

Figure 4:
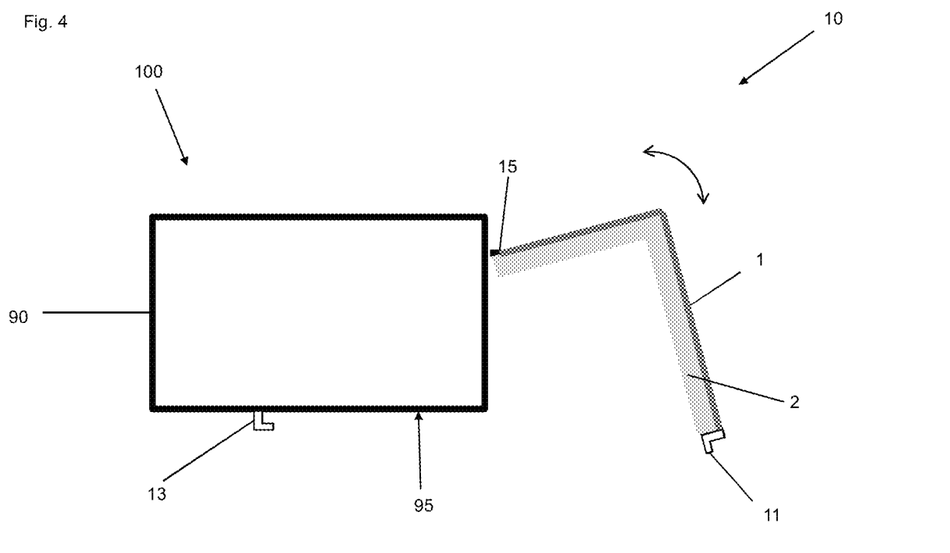
FIG. 4 is a schematic representation of a hand-held tool battery according to the invention with a protective shell of a tool battery fastened thereto.

A hand-held tool battery 100 according to the invention in FIG. 4 comprises a protective shell of a tool battery 10, which is fastened on the tool battery housing 90 of the hand-held tool battery 100 in a foldable manner via a film hinge 15 of a flexible plastic. The protective shell of a tool battery 10 comprises a catch lug 11, which is configured to engage a corresponding catch seat 13, which is arranged on the tool battery housing 90. Catch lug 11 and corresponding catch seat 13 form a snap-in connection 11, 13.

Figure 5:
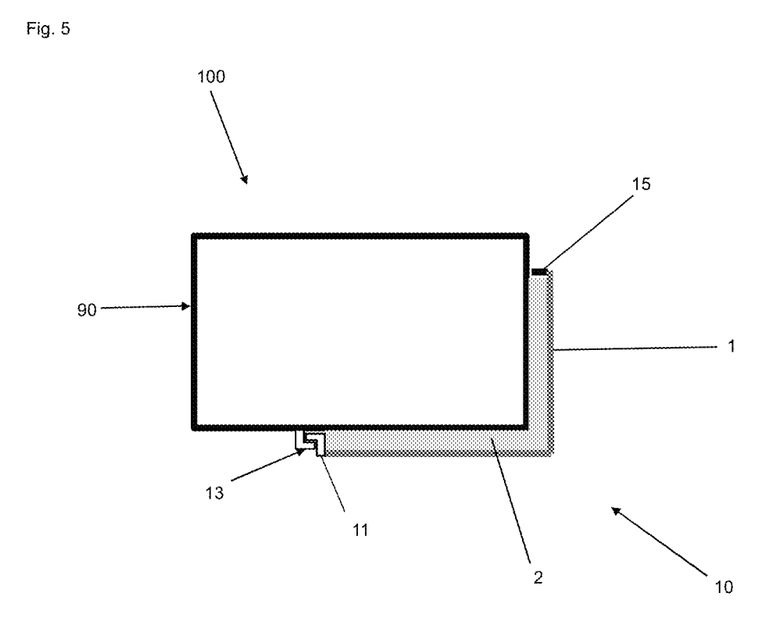
FIG. 5 is an additional schematic representation of the hand-held tool battery from FIG. 4.

FIG. 5 shows the hand-held tool battery 100 from FIG. 4, and the protective shell of a tool battery 10 is now arranged on the tool battery housing 90 for the intended purpose. This means that the catch lug 11 of the protective shell of a tool battery 10 is snapped into the corresponding catch seat 13 of the tool battery housing 90.

Figure 6A:
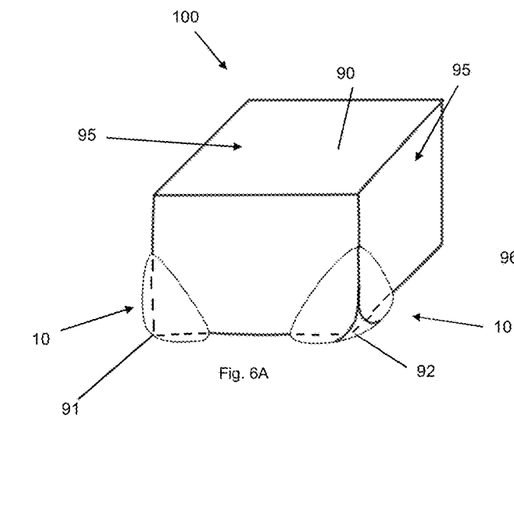
FIGS. 6A to 6B are schematic representations of a protective shell of a tool battery formed as a corner protector/edge protector.

In FIG. 6A, a protective shell of a tool battery 10 is represented, which is configured as a corner protector. The protective shell of a tool battery 10 is configured to precisely accommodate a corner 91, 92 of the tool battery housing 90 and to leave a predominate portion of the surface 95 of the tool battery housing 90 uncovered. In the exemplary embodiment of FIG. 6A, a respective protective shell of a tool battery 10 is configured to accommodate precisely one corner, i.e., corner 91 or corner 92 of the hand-held tool battery 100.

Figure 6B:
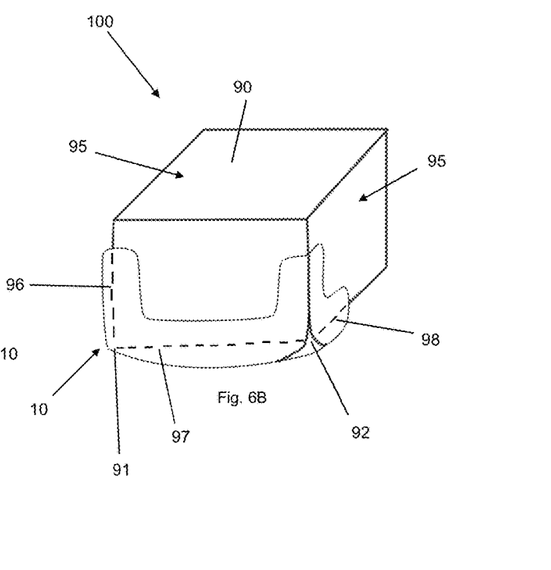

A protective shell of a tool battery 10, which is configured as a combined corner-edge protector, is represented in FIG. 6B. The protective shell of a tool battery 10 of FIG. 6B is configured to completely accommodate precisely two corners 91, 92 of the tool battery housing 90 and also to completely enclose an edge 97 running between the corners 91, 92. Moreover, the protective shell of a tool battery 10 of FIG. 6B is configured to precisely accommodate an additional edge 96 as well as an additional edge 98 of the tool battery housing 90, but only in sections. As can also be discerned from FIG. 6B, a predominant portion of the surface 95 of the tool battery housing 90 is left uncovered.

Figures 7A, 7B, 7C:
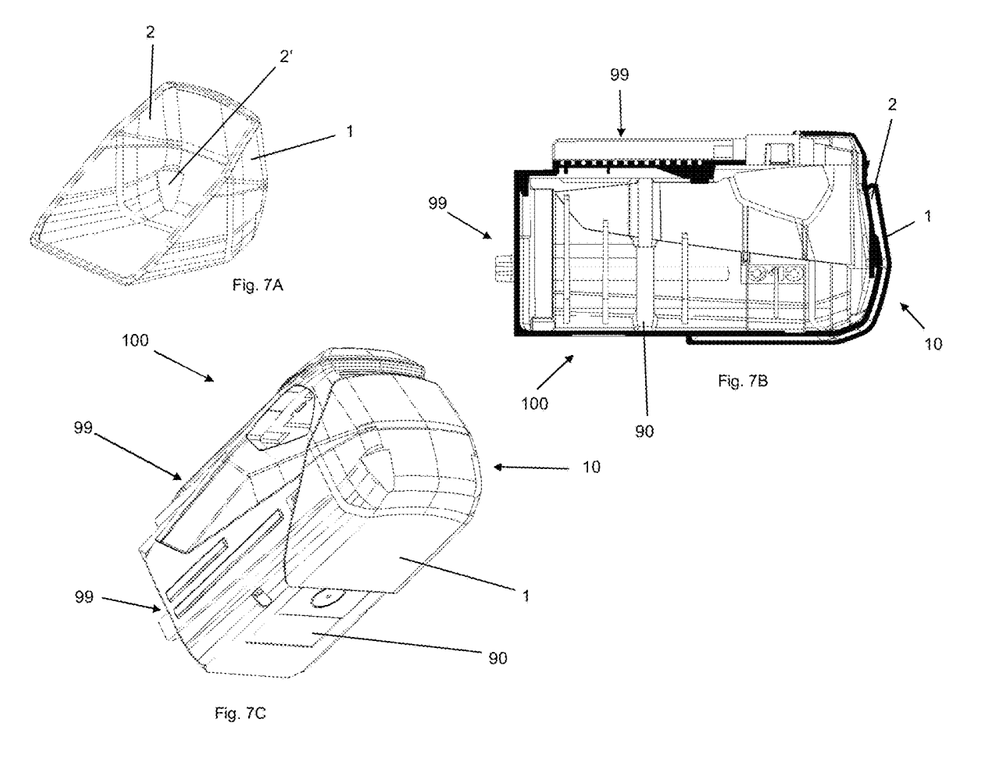
FIGS. 7A to 7C are a plurality of perspective representations and a sectional representation to illustrate the arrangement of a protective shell of a tool battery on a hand-held tool battery formed as a corner and edge protector.

FIG. 7A shows a protective shell of a tool battery 10 configured as a combined corner-edge protector in a perspective representation. In FIGS. 7B and 7C, the protective shell of a tool battery 10 is arranged on a tool battery housing 100, and FIG. 7B represents a sectional representation. As can be discerned from FIGS. 7B and 7C, the protective shell of a tool battery 10, which is configured as a combined corner-edge protector, is arranged opposite a device receiving side 99, via which a connection of the hand-held tool battery 100 to a hand-held machine tool (not shown) is carried out. In other words, the protective shell of a tool battery 10 protects an exposed side of the hand-held tool battery 100 during operation in a hand-held machine tool. As can be discerned from FIG. 7A, the intermediate layer 2 is configured in a reinforced manner in the region 2' since an increased input of impact energy is to be expected at this point. Otherwise, as can be discerned from FIG. 7B, the intermediate layer 2 has a substantially constant wall thickness. The protective shell of a tool battery 10 is configured precisely for the hand-held tool battery 100.

Figure 8:
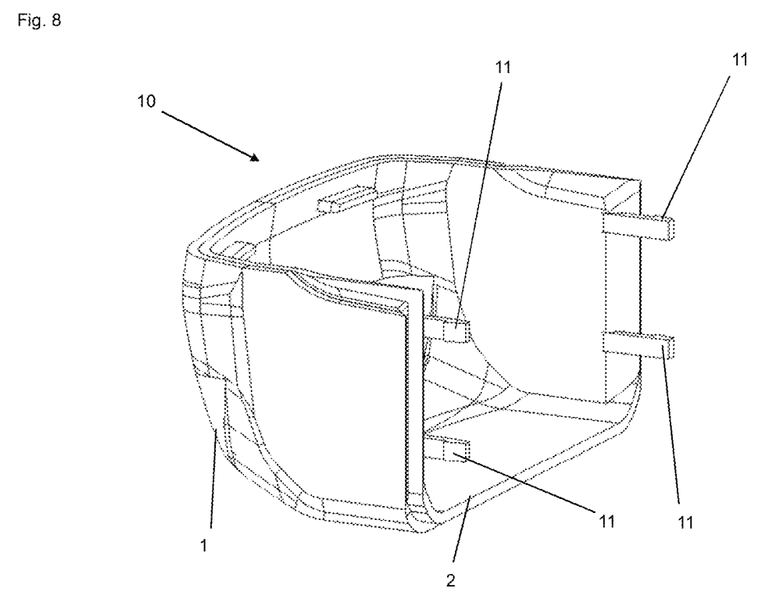
FIG. 8 is a schematic representation of an additional exemplary embodiment of a protective shell of a tool battery comprising a snap-in connection.
Figure 9:
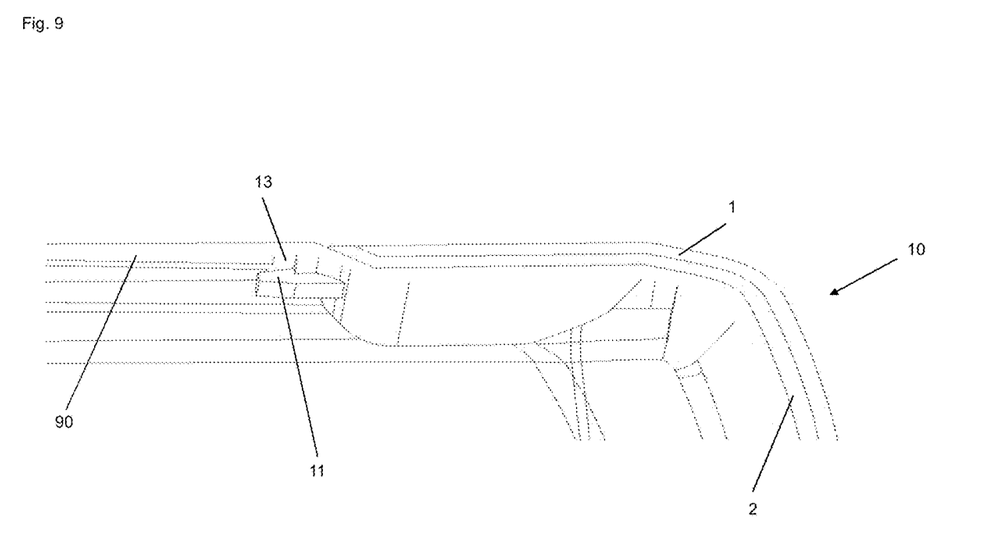
FIG. 9 a schematic representation of a part of the protective shell of a tool battery from FIG. 8, fastened to a hand-held tool battery.

FIG. 8 shows an additional exemplary embodiment of a protective shell of a tool battery 10 according to the invention, and it comprises precisely four catch lugs 11 for fastening the protective shell of a tool battery 10 to the hand-held tool battery 100 represented in FIG. 9 in sections. FIG. 9 shows how the catch lugs 11 in a catch seat 13, configured in present case as an undercut, are covered by the tool battery housing 90.

LIST OF REFERENCE NUMERALS

1 outer shell
2, 4 intermediate layer 3 additional shell
4 additional intermediate layer
10 protective shell of a tool battery
11 catch lug
13 catch seat
90 tool battery housing
91, 92 corner
95 surface of the tool battery housing
96, 97, 98 edge
100 hand-held tool battery
A battery cells
E1 outer shell elasticity modulus
E2 intermediate layer elasticity modulus
E90 elasticity modulus of the tool battery housing
G overall wall thickness

The invention claimed is:

1. A protective shell of a tool battery attachable to a tool battery housing of a hand-held tool battery, comprising:
a sandwich construction with an outer shell and an intermediate layer, wherein the intermediate layer is a damping layer and is softer and/or more elastic than the outer shell;
wherein the intermediate layer is disposed on the outer shell such that the intermediate layer is disposed between the outer shell and an external surface of the tool battery housing when the protective shell is attached to the external surface of the tool battery housing; and wherein the outer shell and the intermediate layer consist of a same material and have different thicknesses each and wherein the intermediate layer consists of a foamed plastic.

2. The protective shell of a tool battery according to claim 1, wherein the outer shell has an outer shell elasticity modulus and the intermediate layer has an intermediate layer elasticity modulus and wherein the outer shell elasticity modulus is greater than the intermediate layer elasticity modulus.

3. The protective shell of a tool battery according to claim 1, wherein the outer shell has a higher shore hardness than the intermediate layer.

4. The protective shell of a tool battery according to claim 1, wherein the intermediate layer consists of an elastomer.

5. The protective shell of a tool battery according to claim 1, wherein the sandwich construction includes an additional shell and an additional intermediate layer.

6. The protective shell of a tool battery according to claim 5, wherein the outer shell and/or the additional shell consists of a shock-resistant plastic.

7. The protective shell of a tool battery according to claim 1, wherein the intermediate layer has a wall thickness of between 0.5 mm and 10 mm and/or the outer shell has a wall thickness of between 0.5 mm and 10 mm.

8. The protective shell of a tool battery according to claim 1, wherein the intermediate layer has a substantially constant wall thickness.

9. The protective shell of a tool battery according to claim 1, wherein a first wall thickness at a first location of the intermediate layer is greater than a second wall thickness at a second location of the intermediate layer, wherein the first location is proximate to an impact location of the tool battery.

10. The protective shell of a tool battery according to claim 1, wherein an overall wall thickness of the protective shell is less than 10 mm.

11. The protective shell of a tool battery according to claim 1, wherein the protective shell is attachable to the tool battery housing by an adhesive connection.

12. The protective shell of a tool battery according to claim 1, wherein the protective shell is attachable to the tool battery housing by a snap-in connection.

13. The protective shell of a tool battery according to claim 1, wherein the outer shell and/or the intermediate layer are formed on the tool battery housing by an injection molding process.

14. The protective shell of a tool battery according to claim 1, wherein the protective shell is configured as a corner protector and/or an edge protector, wherein the protective shell is configured to precisely accommodate a corner and/or an edge of the tool battery housing and to leave a predominate portion of the surface of the tool battery housing uncovered.

15. A hand-held tool battery, comprising:
a tool battery housing; and
a protective shell according to claim 1, wherein the protective shell is attachable to the tool battery housing.

* * * * *